United States Patent
Oh et al.

(10) Patent No.: US 10,049,575 B2
(45) Date of Patent: Aug. 14, 2018

(54) APPARATUS AND METHOD FOR GENERATING PATH OF VEHICLE

(71) Applicant: Hyundai Motor Company, Seoul (KR)

(72) Inventors: Dong Eon Oh, Seoul (KR); Min Yong Shin, Seoul (KR); Hoi Won Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/435,935

(22) Filed: Feb. 17, 2017

(65) Prior Publication Data

US 2018/0174459 A1    Jun. 21, 2018

(30) Foreign Application Priority Data

Dec. 15, 2016  (KR) .......................... 10-2016-0171746

(51) Int. Cl.
  *G08G 1/16* (2006.01)
  *G06F 17/10* (2006.01)
  *B60W 30/09* (2012.01)

(52) U.S. Cl.
  CPC .............. *G08G 1/166* (2013.01); *G08G 1/167* (2013.01); *B60W 30/09* (2013.01); *B60W 2520/10* (2013.01); *B60W 2520/14* (2013.01); *B60W 2550/306* (2013.01); *B60W 2550/308* (2013.01)

(58) Field of Classification Search
  CPC ....... G08G 1/166; G08G 1/167; B60W 30/09; B60W 2520/10; B60W 2520/14; B60W 2550/306; B60W 2550/308

USPC ......................................................... 701/301
See application file for complete search history.

(56) References Cited

U.S. PATENT DOCUMENTS

| | | |
|---|---|---|
| 6,311,119 B2 | 10/2001 | Sawamoto et al. |
| 8,862,326 B2 | 10/2014 | Tsuruta et al. |
| 9,403,555 B2 | 8/2016 | Ueda et al. |
| 2005/0278112 A1 | 12/2005 | Gem et al. |
| 2015/0307095 A1 | 10/2015 | Aso |
| 2016/0288790 A1 | 10/2016 | Aoki et al. |

FOREIGN PATENT DOCUMENTS

| | | |
|---|---|---|
| JP | 2003-296899 A | 10/2003 |
| JP | 2015-069229 A | 4/2015 |
| KR | 10-1215219 | 12/2012 |
| KR | 10-1249366 | 4/2013 |

*Primary Examiner* — Gertrude Arthur Jeanglaude
(74) *Attorney, Agent, or Firm* — Mintz Levin Cohn Ferris Glovsky and Popeo, P.C.; Peter F. Corless

(57) ABSTRACT

An apparatus and a method for generating a path of a vehicle are provided. The apparatus includes a first sensor that detects lane marking information, a second sensor that detects a driving speed of a subject vehicle, a third sensor that detects a yaw rate of the subject vehicle and a fourth sensor that detects a relative position of a preceding vehicle with respect to the subject vehicle. A controller then calculates a trajectory of the preceding vehicle based on the driving speed and the yaw rate of the subject vehicle and the relative position of the preceding vehicle with respect to the subject vehicle. Additionally, the controller generates a driving path of the subject vehicle using of the calculated trajectory of the preceding vehicle and the lane marking information.

20 Claims, 4 Drawing Sheets

APPARATUS AND METHOD FOR GENERATING PATH OF VEHICLE

CROSS-REFERENCE TO RELATED APPLICATION

This application is based on and claims the benefit of priority to Korean Patent Application No. 10-2016-0171746, filed on Dec. 15, 2016, in the Korean Intellectual Property Office, the disclosure of which is incorporated herein in its entirety by reference.

TECHNICAL FIELD

The present disclosure relates to an apparatus and a method for generating a path of a vehicle, and more particularly, to a technology for stably generating a path even when the reliability of lane marking information is degraded due to various limitations (backlight, brightness variation, and the like) of an imaging device, road environment (worn and faded lane markings, reflection of light by lane markings, and the like), and driving environment (lane markings hidden by vehicles ahead, low speed driving, and the like).

BACKGROUND

Advanced driver assistance systems developed to assist steering are being extended from a lane keeping assist system (LKAS) to a highway driving assist system (HDAS) that allows a vehicle to steer autonomously under limited circumstances without driver intervention. It is essential to generate a driving path to control a vehicle more stably. In general, lane marking information is commonly used to generate a path for safe driving within a lane.

A conventional technology for generating a driving path of a vehicle detects lane marking information using an imaging device. However, when the reliability of lane marking information is degraded or the detection thereof is no possible due to limitations (backlight, brightness variation, and the like) of the imaging device, road environment (worn and faded lane markings, reflection of light by lane markings, and the like), and driving environment (lane markings hidden by vehicles ahead, low speed driving, and the like), the driving path may not be generated, and thus LKAS, HDAS, and the like may not operate.

As a result, according to the conventional technology, unreliable lane marking information may be detected or the detection of lane marking information may fail, resulting in failures to operate LKAS, HDAS, and the like. Such frequent failures to operate LKAS, HDAS and the like may reduce consumer preference for vehicles, leading to a drop in consumer confidence.

SUMMARY

The present disclosure provides an apparatus and a method for generating a path of a vehicle, characterized by calculating a trajectory of a preceding vehicle based on driving information of a subject vehicle and a relative position of the preceding vehicle with respect to the subject vehicle and generating a path of the subject vehicle through complementary use of the calculated trajectory of the preceding vehicle and lane marking information, thereby stably generating the path even when the reliability of the lane marking information is degraded due to limitations (backlight, brightness variation, and the like) of an imaging device (e.g., a camera, video camera, or the like), road environment (worn and faded lane markings, reflection of light by lane markings, and the like), and driving environment (lane markings hidden by preceding vehicles, low speed driving, and the like).

The objects of the present disclosure are not limited to the foregoing objects and any other objects and advantages not mentioned herein will be clearly understood from the following description. The present inventive concept will be more clearly understood from exemplary embodiments of the present disclosure. In addition, it will be apparent that the objects and advantages of the present disclosure can be achieved by elements and features claimed in the claims and a combination thereof.

According to an aspect of the present disclosure, an apparatus for generating a path of a vehicle my include: a first sensor configured to detect lane marking information; a second sensor configured to detect a driving speed of a subject vehicle; a third sensor configured to detect a yaw rate of the subject vehicle; a fourth sensor configured to detect a relative position of a preceding vehicle with respect to the subject vehicle; and a controller configured to calculate a trajectory of the preceding vehicle based on the driving speed and the yaw rate of the subject vehicle and the relative position of the preceding vehicle with respect to the subject vehicle, and generate a driving path of the subject vehicle through complementary use of the calculated trajectory of the preceding vehicle and the lane marking information.

The lane marking information may include an average value (a) of a curvature derivative of a left line and a curvature derivative of a right line, an average value (b) of a curvature of the left line and a curvature of the right line, an average value (c) of a heading angle of the subject vehicle with respect to the left line and a heading angle of the subject vehicle with respect to the right line, and an average value (d) of a location of the subject vehicle with respect to the left line and a location of the subject vehicle with respect to the right line. The trajectory may include a curvature (f), a heading angle (g), and a location (h).

The controller may be configured to generate the driving path of the subject vehicle using the curvature (f) of the trajectory and the average value (c) of the heading angles and the average value (d) of the locations when the speed of the subject vehicle is less than or equal to a first threshold and a distance of the subject vehicle from the preceding vehicle is less than a second threshold. Additionally, the controller may be configured to generate the driving path of the subject vehicle using the average value (c) of the heading angles and the average value (d) of the locations when the speed of the subject vehicle is less than or equal to a first threshold and a distance of the subject vehicle from the preceding vehicle is greater than or equal to a second threshold.

The controller may be configured to generate the driving path of the subject vehicle using the curvature (f), heading angle (g), and location (h) of the trajectory when the speed of the subject vehicle is less than or equal to a first threshold and the lane marking information is not detected. The controller may be configured to generate the driving path of the subject vehicle using the average value (a) of the curvature derivatives, the average value (b) of the curvatures, the average value (c) of the heading angles, and the average value (d) of the locations when the speed of the subject vehicle exceeds a first threshold and the lane marking information is detected. The controller may further be configured to generate the driving path of the subject vehicle using the curvature (f), heading angle (g), and location (h) of the trajectory when the speed of the subject vehicle exceeds a first threshold and the lane marking information is not detected.

According to another aspect of the present disclosure, a method for generating a path of a vehicle may include: detecting, by a first sensor, lane marking information; detecting, by a second sensor, a driving speed of a subject vehicle; detecting, by a third sensor, a yaw rate of the subject vehicle; detecting, by a fourth sensor, a relative position of a preceding vehicle with respect to the subject vehicle; and calculating, by a controller, a trajectory of the preceding vehicle based on the driving speed and the yaw rate of the subject vehicle and the relative position of the preceding vehicle with respect to the subject vehicle, and generating a driving path of the subject vehicle through complementary use of the calculated trajectory of the preceding vehicle and the lane marking information.

The lane marking information may include an average value (a) of a curvature derivative of a left line and a curvature derivative of a right line, an average value (b) of a curvature of the left line and a curvature of the right line, an average value (c) of a heading angle of the subject vehicle with respect to the left line and a heading angle of the subject vehicle with respect to the right line, and an average value (d) of a location of the subject vehicle with respect to the left line and a location of the subject vehicle with respect to the right line. The trajectory may include a curvature (f), a heading angle (g), and a location (h).

The generating of the driving path may include generating the driving path of the subject vehicle using the curvature (f) of the trajectory and the average value (c) of the heading angles and the average value (d) of the locations when the speed of the subject vehicle is less than or equal to a first threshold and a distance of the subject vehicle from the preceding vehicle is less than a second threshold. The generating of the driving path may further include generating the driving path of the subject vehicle using the average value (c) of the heading angles and the average value (d) of the locations when the speed of the subject vehicle is less than or equal to a first threshold and a distance of the subject vehicle from the preceding vehicle is greater than or equal to a second threshold.

Additionally, the generating of the driving path may include generating the driving path of the subject vehicle using the curvature (f), heading angle (g), and location (h) of the trajectory when the speed of the subject vehicle is less than or equal to a first threshold and the lane marking information is not detected. The generating of the driving path may include generating the driving path of the subject vehicle using the average value (a) of the curvature derivatives, the average value (b) of the curvatures, the average value (c) of the heading angles, and the average value (d) of the locations when the speed of the subject vehicle exceeds a first threshold and the lane marking information is detected. The generating of the driving path may also include generating the driving path of the subject vehicle using the curvature (f), heading angle (g), and location (h) of the trajectory when the speed of the subject vehicle exceeds a first threshold and the lane marking information is not detected.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
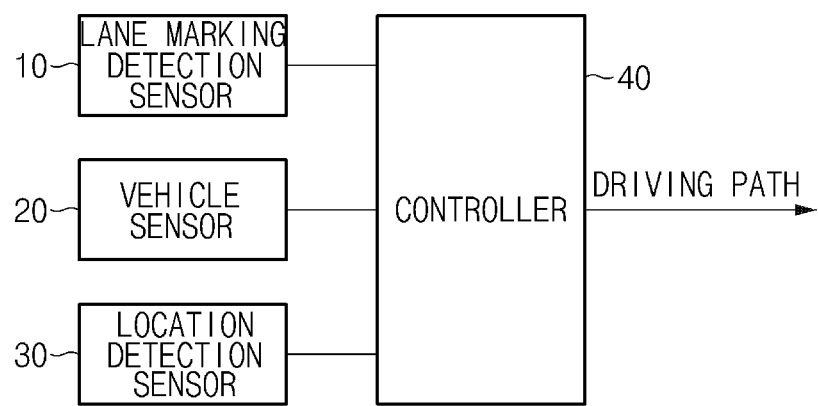
FIG. 1 illustrates a block diagram of the configuration of an apparatus for generating a path of a vehicle, according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The above and other objects, features, and advantages of the present disclosure will be more clearly understood from the following detailed description taken in conjunction with the accompanying drawings so that those skilled in the art to which the present disclosure pertains can easily carry out technical ideas described herein. In addition, a detailed description of well-known techniques associated with the present disclosure will be ruled out in order not to unnecessarily obscure the gist of the present disclosure. Hereinafter, exemplary embodiments of the present disclosure will be described in detail with reference to the accompanying drawings.

FIG. 1 illustrates a block diagram of the configuration of an apparatus for generating a path of a vehicle, according to an exemplary embodiment of the present disclosure. As illustrated in FIG. 1, the apparatus for generating a path of a vehicle, according to the exemplary embodiment of the present disclosure, may include a lane marking detection sensor 10, a vehicle sensor 20, a location detection sensor 30, and a controller 40. The controller 40 may be configured to operate the various sensors.

With respect to each of the aforementioned elements, first, the lane marking detection sensor 10 is a first sensor configured to detect lane marking information from a front-view image in front of a subject vehicle captured by an imaging device. The detected lane marking information may be expressed in the form of a three-dimensional (3D) equation. For example, the lane marking information may be expressed as equation 1 below:

$$y=ax^3+bx^2+cx+d \qquad \text{Equation 1}$$

wherein a represents a curvature derivative; b represents a curvature; c represents a heading angle; and d represents a location (an offset between a lane marking (line) and a vehicle). For reference, each of a, b, c, and d may be an average value. In general, the lane marking detection sensor 10 may be configured to detect left and right lane markings (painted lines) in relation to the vehicle in the form of the aforementioned 3D equation.

According to exemplary embodiments of the present disclosure, a driving path may be generated to allow the vehicle to drive between the left and right lines (e.g., to maintain vehicle driving within the lines), using an average value (a) of a curvature derivative of the left line and a curvature derivative of the right line, an average value (b) of a curvature of the left line and a curvature of the right line, an average value (c) of a heading angle of the vehicle with respect to the left line and a heading angle of the vehicle with respect to the right line, and an average value (d) of a location of the vehicle with respect to the left line and a location of the vehicle with respect to the right line.

In addition, the lane marking detection sensor 10 may be configured to extract line feature points from the image captured by the imaging device, compare lines detected by applying the extracted feature points to the equation with the line feature points, detect candidate lines of which the distance error is less than or equal to a predetermined threshold, and determine lines adjacent to the vehicle, i.e., the left and right lines of the vehicle, among the detected candidate lines as lines by which a current driving lane of the vehicle is marked.

The vehicle sensor 20 may include various types of sensors mounted within the vehicle. Particularly, the vehicle sensor 20 may include a speed sensor (e.g., a second sensor) and a yaw rate sensor (e.g., a third sensor). The speed sensor may be configured to detect a driving speed of the vehicle, and the yaw rate sensor may be configured to detect a yaw rate of the vehicle. The location detection sensor 30 is a fourth sensor configured to detect a relative position of a preceding vehicle with respect to the subject vehicle. The relative position may be defined by the location of the preceding vehicle detected in relation to the subject vehicle.

The controller 40 generally may be configured to operate the aforementioned respective elements to perform the functions thereof normally. In particular, the controller 40 may be configured to calculate a trajectory of the preceding vehicle based on the driving speed of the subject vehicle measured by the speed sensor, the yaw rate of the subject vehicle measured by the yaw rate sensor, and the relative position of the preceding vehicle with respect to the subject vehicle detected by the location detection sensor 30. In particular, the trajectory of the preceding vehicle may be expressed as an equation representing points at which the preceding vehicle has moved. For example, the trajectory of the preceding vehicle may be expressed as equation 2 below:

$$y=fx^2+gx+h \qquad \text{Equation 2}$$

wherein f represents a curvature; g represents a heading angle; and h represents a location (an offset between the trajectory of the preceding vehicle and the subject vehicle).

In addition, the controller 40 may be configured to generate the driving path of the subject vehicle through complementary use of the calculated trajectory of the preceding vehicle and the lane marking information. For example, when the speed of the subject vehicle is less than or equal to a first threshold (e.g., 30 kph) and a distance of the subject vehicle from the preceding vehicle is less than a second threshold (e.g., 60~70 m), the path of the subject vehicle may be generated using the curvature (f) of the trajectory and the average value (c) of the heading angles and the average value (d) of the locations in the lane marking information. This example corresponds to when the lane marking information is detected. Wherein the path of the subject vehicle may be expressed as equation 3 below:

$$y=fx^2+cx+d \qquad \text{Equation 3}$$

For example, when the speed of the subject vehicle is less than or equal to the first threshold and the distance of the subject vehicle from the preceding vehicle is greater than or equal to the second threshold, the path of the subject vehicle may be generated using the average value (c) of the heading angles and the average value (d) of the locations. This example corresponds when the lane marking information is detected. Wherein the path of the subject vehicle may be expressed as equation 4 below:

$$y=cx+d \qquad \text{Equation 4}$$

For example, when the speed of the subject vehicle is less than or equal to the first threshold and the lane marking information is not detected, the path of the subject vehicle may be generated using the curvature (f), heading angle (g), and location (h) of the trajectory. Wherein the path of the subject vehicle may be expressed as equation 2. This example corresponds to when the trajectory of the preceding vehicle is calculated. When the trajectory of the preceding vehicle is not calculated, the path of the subject vehicle is not generated.

In the above-described examples, the subject vehicle is traveling at low speed. Hereinafter, examples in which the subject vehicle is traveling at high speed will be described. For example, when the speed of the subject vehicle exceeds the first threshold and the lane marking information is detected, the path of the subject vehicle may be generated using the average value (a) of the curvature derivatives, the average value (b) of the curvatures, the average value (c) of the heading angles, and the average value (d) of the locations. Wherein the path of the subject vehicle may be expressed as equation 1.

When the speed of the subject vehicle exceeds the first threshold and the lane marking information is not detected, the path of the subject vehicle may be generated using the curvature (f), heading angle (g), and location (h) of the trajectory. Wherein the path of the subject vehicle may be expressed as equation 2. This example corresponds to when the trajectory of the preceding vehicle is calculated. When the trajectory of the preceding vehicle is not calculated, the path of the subject vehicle is not generated.

Figure 2:
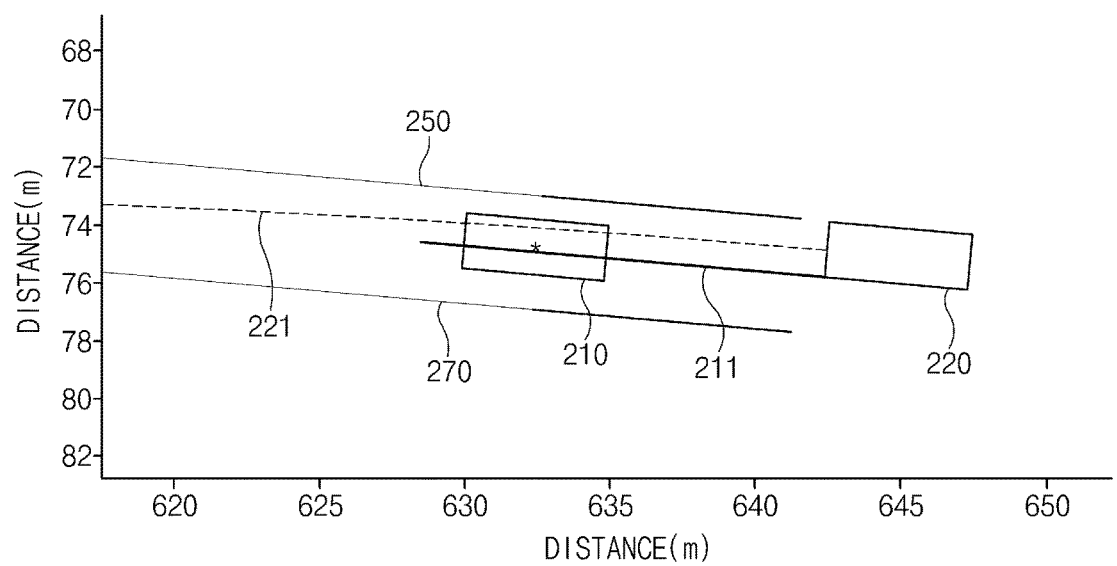
FIG. 2 illustrates an example of a driving path generated by an apparatus for generating a path of a vehicle, according to an exemplary embodiment of the present disclosure.

FIG. 2 illustrates an example of a driving path generated by an apparatus for generating a path of a vehicle, according to an exemplary embodiment of the present disclosure. Particularly, FIG. 2 illustrates a driving path 211 of a subject vehicle 210 generated when the subject vehicle 210 is traveling at low speed, in the presence of a left line 250 and a right line 270 of the subject vehicle 210, and a distance of the subject vehicle 210 from a preceding vehicle 220 is within an effective range. In FIG. 2, "221" represents a trajectory of the preceding vehicle 220.

In particular, the controller 40 may be configured to generate the driving path 211 of the subject vehicle 210 using the curvature (f) of the trajectory 221 of the preceding vehicle 220 and the average value (c) of the heading angles and the average value (d) of the locations in the lane marking information. When the distance of the subject vehicle 210 from the preceding vehicle 220 is beyond the effective range, the reliability of the curvature of the trajectory 221 of the preceding vehicle 220 may be degraded. Thus, the curvature of the trajectory 221 of the preceding vehicle 220 may be excluded, and the driving path 211 of the subject vehicle 210 may be generated using the average value (c) of the heading angles and the average value (d) of the locations in the lane marking information. Accordingly, the driving path of the subject vehicle may be generated more stably without following the preceding vehicle even when the preceding vehicle exhibits abnormal movements or changes lanes.

Figure 3:
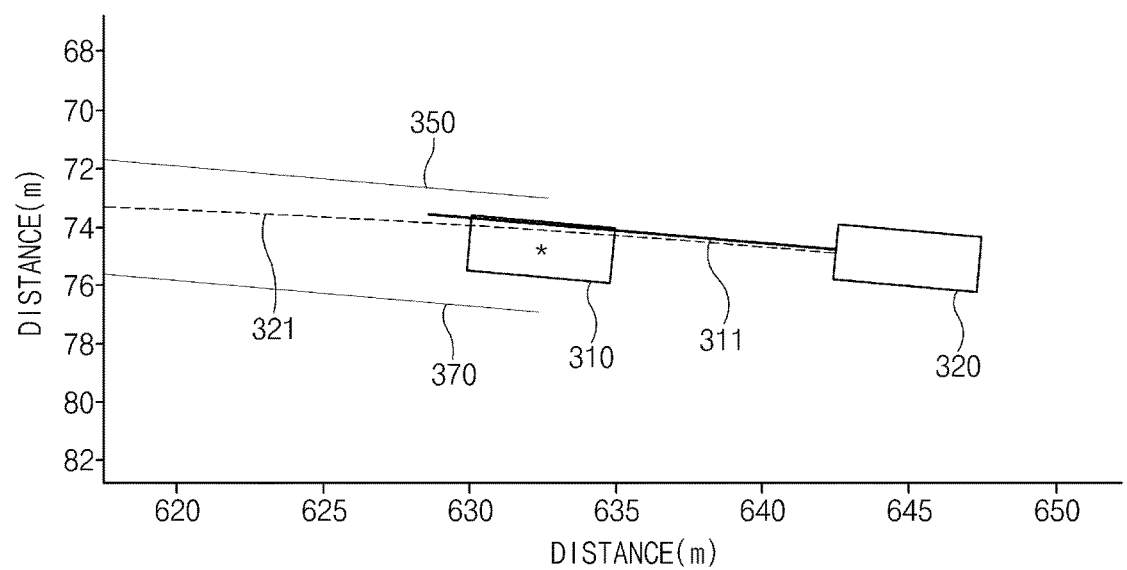
FIG. 3 illustrates another example of a driving path generated by an apparatus for generating a path of a vehicle, according to an exemplary embodiment of the present disclosure.

FIG. 3 illustrates another example of a driving path generated by an apparatus for generating a path of a vehicle, according to an exemplary embodiment of the present disclosure. FIG. 3 illustrates a driving path 311 of a subject vehicle 310 generated in the absence of a left line 350 and a right line 370 of the subject vehicle 310, irrespective of the speed of the subject vehicle 310. In FIG. 3, "321" represents a trajectory of a preceding vehicle 320.

In FIG. 3, when the left line 350 and the right line 370 of the subject vehicle 310 are not present, lane marking information cannot be detected. Thus, the driving path 311 of the subject vehicle 310 may be generated based on the trajectory 321 of the preceding vehicle 320. Particularly, the absence of the left line and the right line of the subject vehicle 310 includes the actual absence of the lines, and the non-detection of the lines due to limitations (e.g., backlight, brightness variation, and the like) of the imaging device, mad environment (e.g., worn and faded lines, reflection of light by the lines, and the like), and driving environment (e.g., the lines hidden by the preceding vehicle, and the like).

Figure 4:
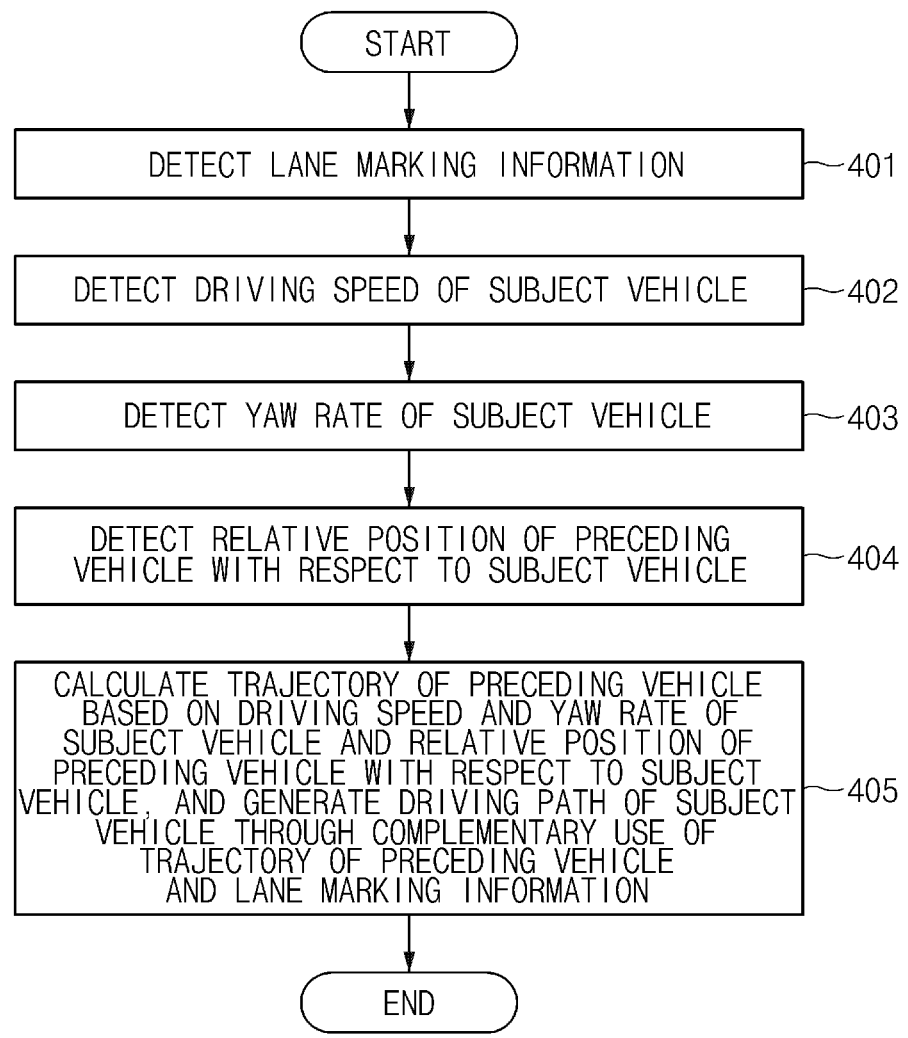
FIG. 4 illustrates a flowchart of a method for generating a path of a vehicle, according to an exemplary embodiment of the present disclosure.

FIG. 4 illustrates a flowchart of a method for generating a path of a vehicle, according to an exemplary embodiment of the present disclosure. First of all, the lane marking detection sensor 10 may be configured to detect lane marking information in operation 401. The speed sensor may be configured to detect a driving speed of a subject vehicle in operation 402. The yaw rate sensor may be configured to detect a yaw rate of the subject vehicle in operation 403. The location detection sensor 30 may be configured to detect a relative position of a preceding vehicle with respect to the subject vehicle in operation 404.

Further, the controller 40 may be configured to calculate a trajectory of the preceding vehicle based on the driving speed and the yaw rate of the subject vehicle and the relative position of the preceding vehicle with respect to the subject vehicle, and generate a driving path of the subject vehicle through complementary use of the calculated trajectory of the preceding vehicle and the lane marking information in operation 405. Once the driving path is generated, the vehicle may be controlled to be driven within the generated driving path. In other words, using a LKAS and HDAS system, the controller may be configured to operate the vehicle to remain within the generated driving path, thus improving driving safety. Accordingly, the vehicle may be autonomously driven without driver intervention using the improved driving path generated even when limitations, the road environment, or the driving environment is unreliable.

As set forth above, by calculating the trajectory of the preceding vehicle based on the driving information of the subject vehicle and the relative position of the preceding vehicle with respect to the subject vehicle and generating the driving path of the subject vehicle through the complementary use of the calculated trajectory of the preceding vehicle and the lane marking information, the driving path may be generated more stably even when the reliability of the lane marking information is degraded due to limitations (backlight, brightness variation, and the like) of the imaging device, road environment (worn and faded lines, reflection of light by the lines, and the like), and driving environment (the lines hidden by the preceding vehicle, low speed driving, and the like).

In addition, by calculating the trajectory of the preceding vehicle based on the driving information of the subject vehicle and the relative position of the preceding vehicle with respect to the subject vehicle and generating the driving path of the subject vehicle through the complementary use of the calculated trajectory of the preceding vehicle and the lane marking information, the driving path of the subject vehicle may be generated more stably without following the preceding vehicle even when the preceding vehicle exhibits abnormal movements or changes lanes.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for generating a path of a vehicle, comprising:
   a first sensor configured to detect lane marking information;
   a second sensor configured to detect a driving speed of a subject vehicle;
   a third sensor configured to detect a yaw rate of the subject vehicle;
   a fourth sensor configured to detect a relative position of a preceding vehicle with respect to the subject vehicle; and a controller configured to calculate a trajectory of the preceding vehicle based on the driving speed and the yaw rate of the subject vehicle and the relative position of the preceding vehicle with respect to the subject vehicle, and generate a driving path of the subject vehicle using the calculated trajectory of the preceding vehicle and the lane marking information.

2. The apparatus according to claim 1, wherein the lane marking information includes an average value (a) of a curvature derivative of a left line and a curvature derivative of a right line, an average value (b) of a curvature of the left line and a curvature of the right line, an average value (c) of a heading angle of the subject vehicle with respect to the left line and a heading angle of the subject vehicle with respect to the right line, and an average value (d) of a location of the subject vehicle with respect to the left line and a location of the subject vehicle with respect to the right line.

3. The apparatus according to claim 2, wherein the trajectory includes a curvature (f), a heading angle (g), and a location (h).

4. The apparatus according to claim 3, wherein the controller is configured to generate the driving path of the subject vehicle using the curvature (f) of the trajectory and the average value (c) of the heading angles and the average value (d) of the locations when the speed of the subject vehicle is less than or equal to a first threshold and a distance of the subject vehicle from the preceding vehicle is less than a second threshold.

5. The apparatus according to claim 3, wherein the controller is configured to generate the driving path of the subject vehicle using the average value (c) of the heading angles and the average value (d) of the locations when the speed of the subject vehicle is less than or equal to a first threshold and a distance of the subject vehicle from the preceding vehicle is greater than or equal to a second threshold.

6. The apparatus according to claim 3, wherein the controller is configured to generate the driving path of the subject vehicle using the curvature (f), heading angle (g), and location (h) of the trajectory when the speed of the subject vehicle is less than or equal to a first threshold and the lane marking information is not detected.

7. The apparatus according to claim 3, wherein the controller is configured to generate the driving path of the subject vehicle using the average value (a) of the curvature derivatives, the average value (b) of the curvatures, the average value (c) of the heading angles, and the average value (d) of the locations when the speed of the subject vehicle exceeds a first threshold and the lane marking information is detected.

8. The apparatus according to claim 3, wherein the controller is configured to generate the driving path of the subject vehicle using the curvature (f), heading angle (g), and location (h) of the trajectory when the speed of the subject vehicle exceeds a first threshold and the lane marking information is not detected.

9. A method for generating a path of a vehicle, comprising:
detecting, by a first sensor, lane marking information;
detecting, by a second sensor, a driving speed of a subject vehicle;
detecting, by a third sensor, a yaw rate of the subject vehicle;
detecting, by a fourth sensor, a relative position of a preceding vehicle with respect to the subject vehicle; and
calculating, by a controller, a trajectory of the preceding vehicle based on the driving speed and the yaw rate of the subject vehicle and the relative position of the preceding vehicle with respect to the subject vehicle, and generating a driving path of the subject vehicle using the calculated trajectory of the preceding vehicle and the lane marking information.

10. The method according to claim 9, wherein the lane marking information includes an average value (a) of a curvature derivative of a left line and a curvature derivative of a right line, an average value (b) of a curvature of the left line and a curvature of the right line, an average value (c) of a heading angle of the subject vehicle with respect to the left line and a heading angle of the subject vehicle with respect to the right line, and an average value (d) of a location of the subject vehicle with respect to the left line and a location of the subject vehicle with respect to the right line.

11. The method according to claim 10, wherein the trajectory includes a curvature (f), a heading angle (g), and a location (h).

12. The method according to claim 11, wherein the generating of the driving path includes:
generating, by the controller, the driving path of the subject vehicle using the curvature (f) of the trajectory and the average value (c) of the heading angles and the average value (d) of the locations when the speed of the subject vehicle is less than or equal to a first threshold and a distance of the subject vehicle from the preceding vehicle is less than a second threshold.

13. The method according to claim 11, wherein the generating of the driving path includes:
generating, by the controller, the driving path of the subject vehicle using the average value (c) of the heading angles and the average value (d) of the locations when the speed of the subject vehicle is less than or equal to a first threshold and a distance of the subject vehicle from the preceding vehicle is greater than or equal to a second threshold.

14. The method according to claim 11, wherein the generating of the driving path includes:
generating, by the controller, the driving path of the subject vehicle using the curvature (f), heading angle (g), and location (h) of the trajectory when the speed of the subject vehicle is less than or equal to a first threshold and the lane marking information is not detected.

15. The method according to claim 11, wherein the generating of the driving path includes:
generating, by the controller, the driving path of the subject vehicle using the average value (a) of the curvature derivatives, the average value (b) of the curvatures, the average value (c) of the heading angles, and the average value (d) of the locations when the speed of the subject vehicle exceeds a first threshold and the lane marking information is detected.

16. The method according to claim 11, wherein the generating of the driving path includes:
generating, by the controller, the driving path of the subject vehicle using the curvature (f), heading angle (g), and location (h) of the trajectory when the speed of the subject vehicle exceeds a first threshold and the lane marking information is not detected.

17. A non-transitory computer readable medium containing program instructions executed by a controller, the computer readable medium comprising:
program instructions that control a first sensor to detect lane marking information;

program instructions that control a second sensor to detect a driving speed of a subject vehicle;

program instructions that control a third sensor to detect a yaw rate of the subject vehicle;

program instructions that control a fourth sensor to detect a relative position of a preceding vehicle with respect to the subject vehicle; and program instructions that calculate a trajectory of the preceding vehicle based on the driving speed and the yaw rate of the subject vehicle and the relative position of the preceding vehicle with respect to the subject vehicle, and generate a driving path of the subject vehicle using the calculated trajectory of the preceding vehicle and the lane marking information.

18. The non-transitory computer readable medium of claim 17, wherein the lane marking information includes an average value (a) of a curvature derivative of a left line and a curvature derivative of a right line, an average value (b) of a curvature of the left line and a curvature of the right line, an average value (c) of a heading angle of the subject vehicle with respect to the left line and a heading angle of the subject vehicle with respect to the right line, and an average value (d) of a location of the subject vehicle with respect to the left line and a location of the subject vehicle with respect to the right line.

19. The non-transitory computer readable medium of claim 18, wherein the trajectory includes a curvature (f), a heading angle (g), and a location (h).

20. The non-transitory computer readable medium of claim 19, wherein the program instructions that generate the driving path include:

program instructions that generate the driving path of the subject vehicle using the curvature (f) of the trajectory and the average value (c) of the heading angles and the average value (d) of the locations when the speed of the subject vehicle is less than or equal to a first threshold and a distance of the subject vehicle from the preceding vehicle is less than a second threshold.

* * * * *